UNITED STATES PATENT OFFICE.

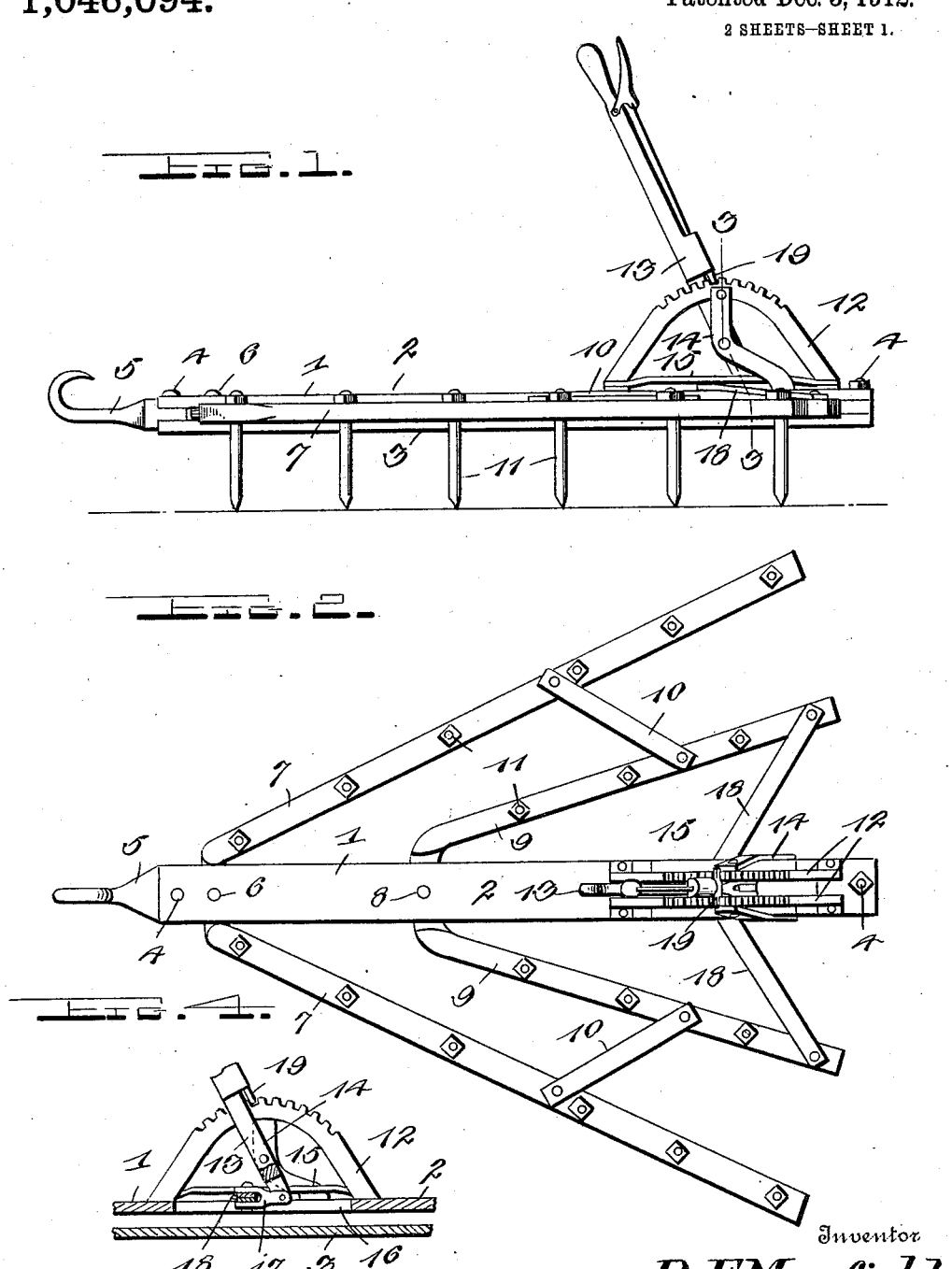

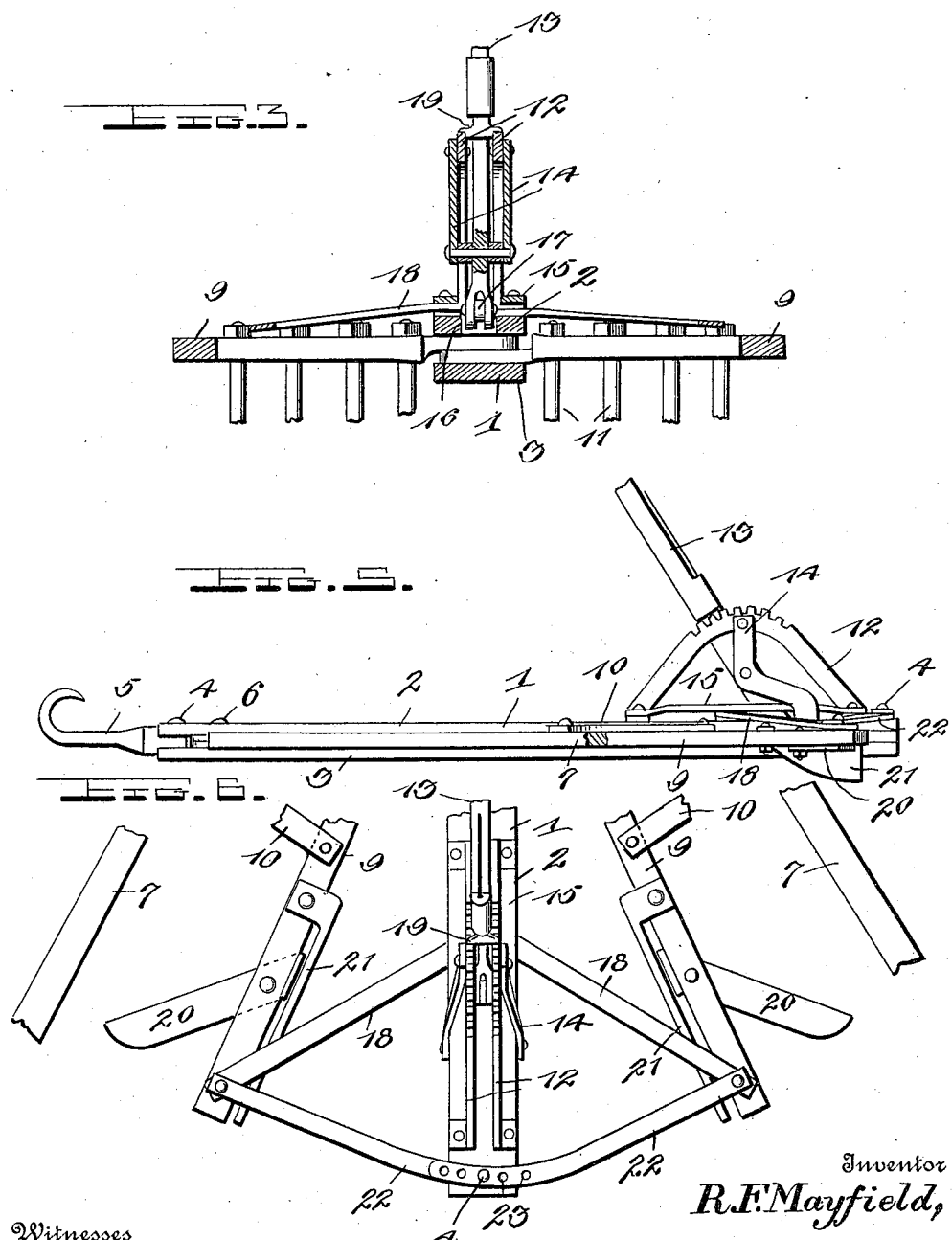

RICHARD FOUNTAIN MAYFIELD, OF OAKLAND, OKLAHOMA.

COMBINED HARROW AND STALK-CUTTER.

1,046,094.

Specification of Letters Patent.

Patented Dec. 3, 1912.

Application filed March 9, 1912. Serial No. 682,663.

*To all whom it may concern:*

Be it known that I, RICHARD FOUNTAIN MAYFIELD, a citizen of the United States, residing at Oakland, in the county of Marshall and State of Oklahoma, have invented certain new and useful Improvements in Combined Harrows and Stalk-Cutters, of which the following is a specification, reference being had to the accompanying drawings.

This invention relates to new and useful improvements in agricultural implements and more particularly to a combined harrow and stalk cutter, and my object is to provide a device of this character which is most efficient in operation in either of the two uses specified.

A further object of the invention resides in the provision of a device which is capable of extension laterally and a further object of the invention resides in providing means for the manual operation of the extension parts.

Still another object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of the device set up for use as a harrow. Fig. 2 is a top plan view thereof. Fig. 3 is a transverse section therethrough. Fig. 4 is a fragmentary horizontal section through the device. Fig. 5 is a side elevation of the device set up for use as a stalk cutter; and Fig. 6 is a fragmentary top plan view thereof.

In describing my invention, I shall refer to the drawings in which similar reference characters designate corresponding parts throughout the several views, and in which—

1 indicates a central beam comprising a pair of spaced longitudinal bars 2 and 3 held together by means of the bolts 4 and secured to the forward end of said bars is a clevis or the like 5 to which may be secured a draft appliance such as a doubletree or the like (not shown). Pivoted on a bolt 6 adjacent the forward end of the beam 1 and between said bars 2 and 3 are the ends of a pair of beams or arms 7, said arms extending to opposite sides of said beam 1 and pivoted to an additional bolt 8, in the rear of the bolt 6 and between said bars 2 and 3, are an additional pair of arms 9, said pairs of arms being connected to one another by means of the pivoted connecting rods 10. To these arms 7 and 9, are removably secured the harrow teeth 11, but it will be understood that any form of ground treating implements may be provided, if desired, and from this construction it will be seen that the arms 7 and 9 may be moved laterally with respect to the beam 1, the two arms of each side moving simultaneously.

I have also provided means whereby the pair of arms on the one side of the beam may be manually moved simultaneously with the movement of the pair on the opposite sides thereof, and to this end, I provide a pair of spaced apart segmental racks 12 between which is disposed a lever 13, which is fulcrumed adjacent its lower end to a pair of bracing arms 14 and the lower end of said lever is projected between a pair of guide bars 15 secured on the rear end of the upper bar 2 and through a slot 16 in said bar 2. This extreme lower end of the lever has pivoted thereto a connecting link 17 which is in turn pivoted to the inner ends of a pair of arms 18. The outer ends of these arms 18 are pivotally connected to the arms 9 adjacent their rear ends and the lever 13 is provided with a detent 19 which is adapted to engage the teeth of the racks 12 so as to retain the arms 7 and 9 in any adjusted position.

The device as above described is particularly adapted for use as a harrow, but my device is also equally well adapted for use as a stalk cutter, as shown in Figs. 5 and 6. When using the device for the latter purpose, the harrow teeth or the ground treating implements carried thereon are removed from the arms 7 and 9 and the stalk cutters 20 are secured to the arms 9 adjacent their rear ends. These cutters extend laterally of the arms and the additional ground cutters 21 are also secured to said arms adjacent the cutters 20, said latter cutters 21 depending from the arms to engage the soil and support the rear end of the device. In order to brace the bars 9, when the device is used as a stalk cutter, the bracing arms 22 are provided, the outer ends of each of which are pivotally connected with the rear ends of said arms 9, while the inner ends of said bracing arms 22, which are provided with a plurality of registering openings 23, are adapted to overlap one another on the rear end of the beam 1. The openings in each of the arms are adapted to aline with an opening in said beam 1 whereupon one of the bolts 4 may be inserted in said alining openings to retain the arms in their adjusted position and thereby brace the arms 9 in use as a stalk cutter. When using the device as a stalk cutter, the arms 9 are adapted to be disposed as close as possible to the central beam 1 and if desired, the arms 7 may be entirely removed from the device, in view of their removable connection with the beam 1 and the arms 9.

From the foregoing, it will be seen that I have provided a simple, inexpensive and efficient means for carrying out the objects of the invention and while I have particularly described the elements most well adapted to perform the functions set forth, it is obvious that various changes in form, proportion and in the minor details of construction may be resorted to without departing from the spirit or sacrificing any of the principles of the invention.

Having thus described this invention what is claimed is:—

1. A device of the class described comprising a central beam, pairs of divergent harrow bars pivotally connected to said beam, connecting means between said pairs of bars, a lever fulcrumed on said beam, a pair of spaced guide bars mounted on the rear end of said beam through which the lower end of said lever extends, a link having pivotal connection with the extreme lower end of said lever, a pair of arms having connection with one pair of said harrow bars, and also having pivotal connection with the opposite end of said link, and means to retain said lever and correspondingly said harrow bars in various adjusted positions.

2. A device of the class described comprising a pair of spaced parallel bars forming a central beam, the upper of said bars being provided with a slot adjacent the rear end thereof, pairs of divergent harrow bars pivotally engaged with said beam, connecting means between said pairs of divergent bars, a pair of spaced guide rails mounted on the upper of said central bars on each side of the slot therein, a lever fulcrumed above said central bars and having the lower end thereof disposed between said guide rails and in the aforesaid slot, a linking member having one end thereof pivotally connected to the extreme lower end of said lever, a pair of connecting arms pivotally connected at one of their ends to one pair of said divergent bars, the opposite end thereof being disposed between the guide rails and the upper of said central bars to have pivotal connection with the opposite end of said linking member, and means to retain said lever and correspondingly said divergent bars in various adjusted positions.

3. A device of the class described comprising a central beam, a pair of divergent arms pivotally connected thereto at the forward ends thereof, removable cutters secured to said arms adjacent the rear ends thereof, a lever fulcrumed on said central beam, connecting means between the lower end of said lever and said arms to adjust the latter laterally of the central beam, and adjustable bracing arms having connection with said divergent arms and the central beam.

4. A device of the class described comprising a central beam having a longitudinal slot therein, a pair of divergent arms pivotally connected thereto at their forward ends, a lever fulcrumed above said central beam, the free end of the same being disposed through the slot formed in said beam, connecting means between the free end of said lever and the rear ends of said arms, laterally extending stalk cutters removably mounted on said divergent arms adjacent their rear ends, ground knives also removably secured to said divergent arms, means to retain said lever and correspondingly said divergent arms in various adjusted positions, and bracing arms having pivotal connection with the rear ends of said divergent arms and having adjustable connection with the rear end of said central beam.

In testimony whereof I hereunto affix my signature in the presence of two witnesses.

RICHARD FOUNTAIN MAYFIELD.

Witnesses:
E. BRUNT,
T. H. CAMPBELL.

---

Copies of this patent may be obtained for five cents each, by addressing the "Commissioner of Patents, Washington, D. C."